United States Patent
Li

(10) Patent No.: US 7,821,238 B1
(45) Date of Patent: Oct. 26, 2010

(54) FEEDBACK LOOP COMPENSATION FOR BUCK/BOOST SWITCHING CONVERTER

(75) Inventor: Yushan Li, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 192 days.

(21) Appl. No.: 12/157,223

(22) Filed: Jun. 9, 2008

(51) Int. Cl.
*G05F 1/613* (2006.01)
(52) U.S. Cl. .................................. 323/224; 323/364
(58) Field of Classification Search .................. 323/224, 323/364, 288, 293
See application file for complete search history.

(56) References Cited

U.S. PATENT DOCUMENTS

| | | | | |
|---|---|---|---|---|
| 6,066,943 | A * | 5/2000 | Hastings et al. | 323/285 |
| 6,114,907 | A | 9/2000 | Sakurai | |
| 6,952,093 | B1 * | 10/2005 | Broach et al. | 324/158.1 |
| 7,218,082 | B2 * | 5/2007 | Walter et al. | 323/273 |
| 7,268,524 | B2 | 9/2007 | Kase et al. | |
| 7,271,660 | B1 | 9/2007 | Carroll | |

OTHER PUBLICATIONS

Biranchinath Sahu et al., "A Low Voltage, Dynamic, Noninverting, Synchronous Buck-Boost Converter for Portable Applications", IEEE Transactions on Power Electronics, vol. 19, No. 2, Mar. 2004, pp. 443-452.

Daniele Corona et al., "Stabilization of switched affine systems: An application to the buck-boost converter", IEEE 2007, Proceedings of the 2007 American Control Conference, Jul. 11-13, 2007, pp. 6037-6042.

* cited by examiner

*Primary Examiner*—Shawn Riley

(57) ABSTRACT

A system and a method are disclosed for providing an optimized feedback loop compensation for a buck/boost switching converter circuit. The buck/boost switching converter circuit may be operating in either a continuous conduction mode boost mode, or a continuous conduction mode buck mode, or a discontinuous conduction mode. A compensation circuit is provided that includes an error amplifier circuit that includes at least one compensation capacitor that provides an additional capacitance that adjusts a location of at least one dominant pole and at least one compensation zero of the buck/boost switching converter circuit to provide optimized feedback loop compensation.

20 Claims, 5 Drawing Sheets

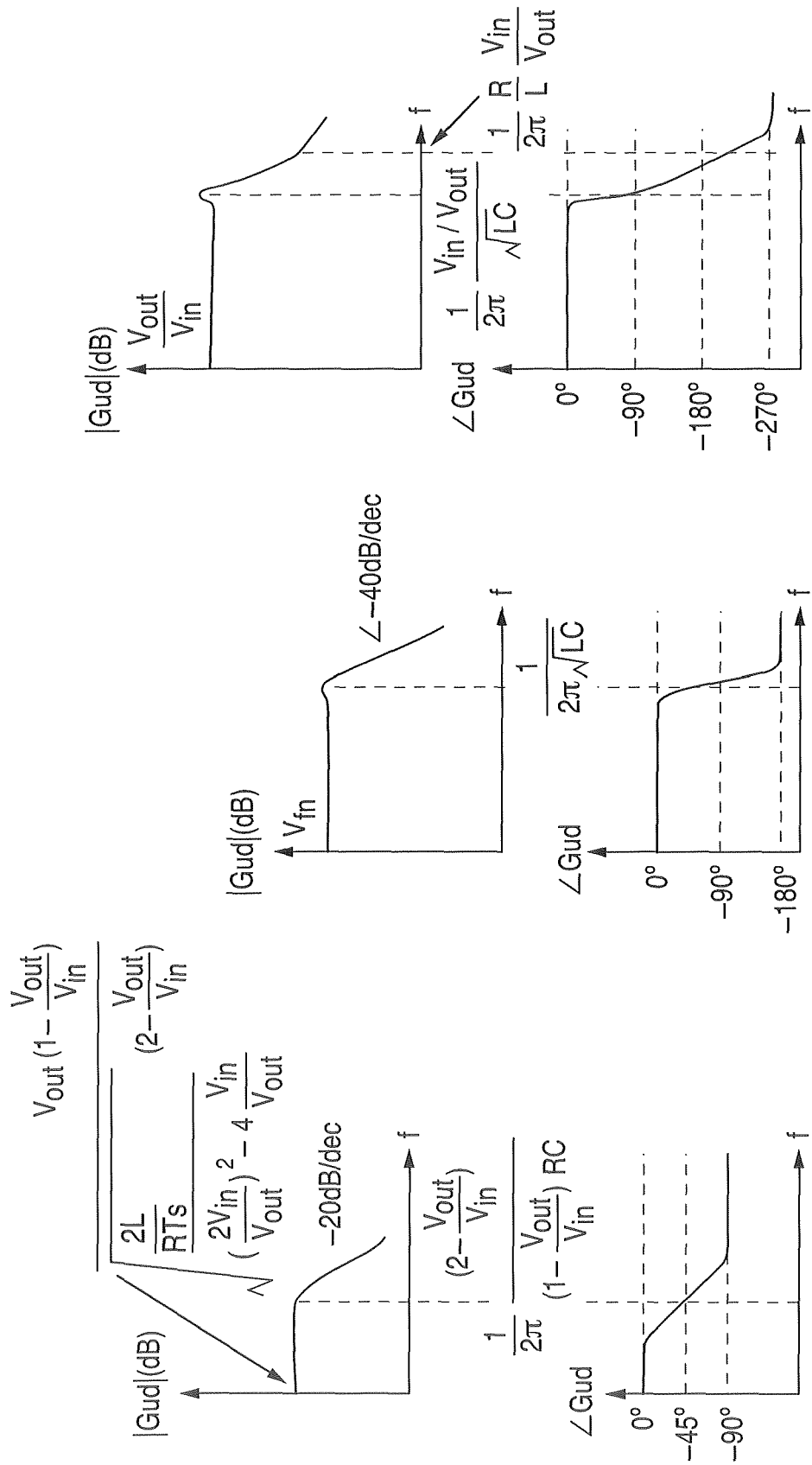

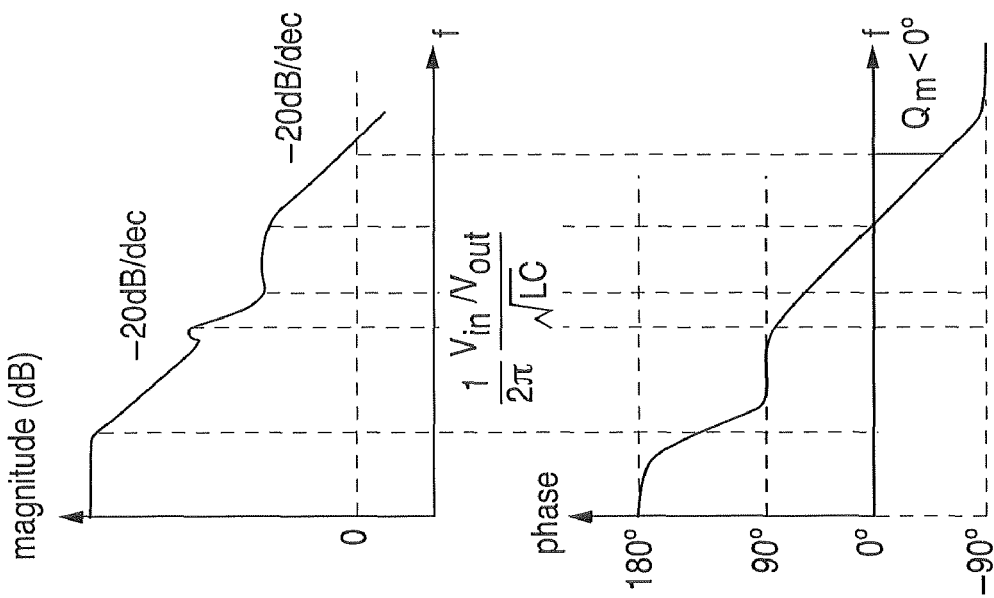
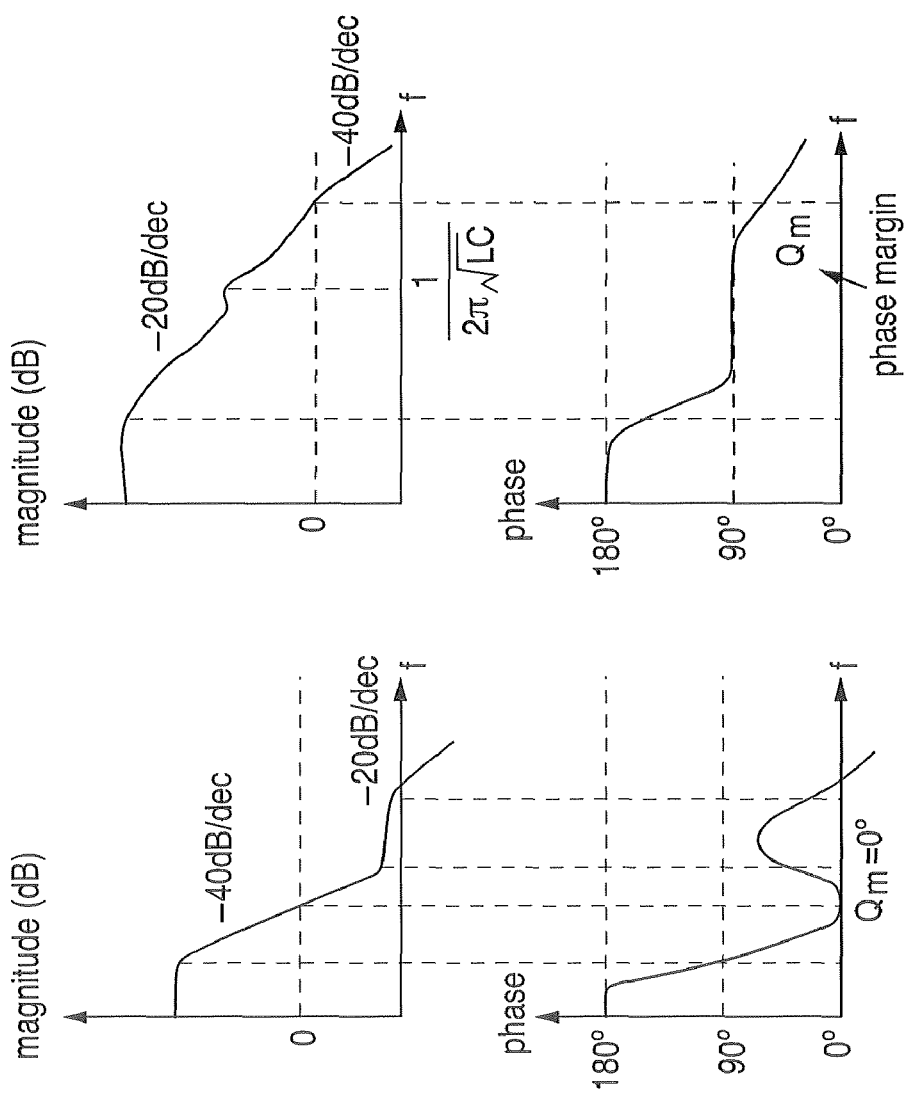
FIG. 3A  FIG. 3B  FIG. 3C

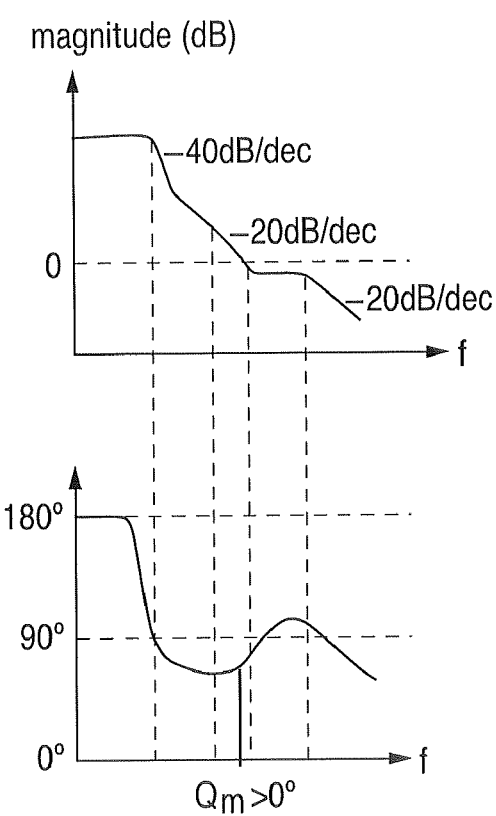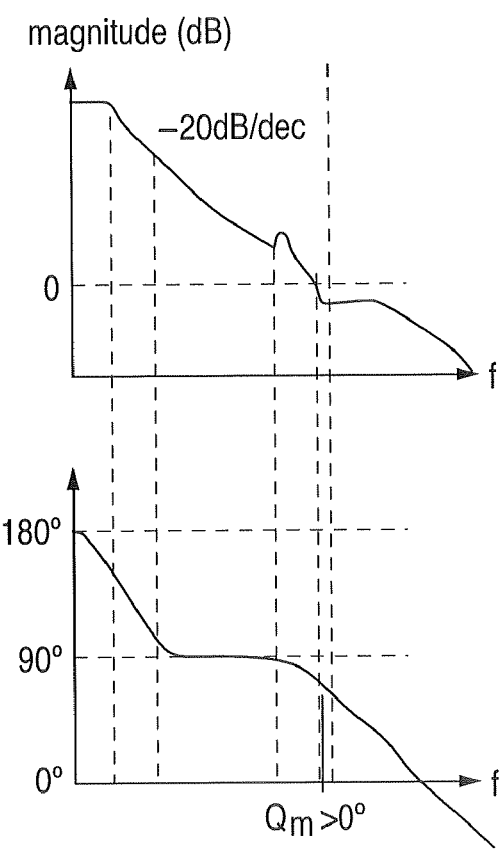
FIG. 4A
FIG. 4B

FEEDBACK LOOP COMPENSATION FOR BUCK/BOOST SWITCHING CONVERTER

TECHNICAL FIELD OF THE INVENTION

The present invention is generally directed to the manufacture of semiconductor circuits and, in particular, to a system and method for providing optimized feedback loop compensation for buck/boost switching power converters.

BACKGROUND OF THE INVENTION

The telecommunications industry continually attempts to improve the transmitter circuitry in wireless communication systems. Power amplifier (PA) circuitry is a major component of a transmitter of a wireless communication device. Power amplifier (PA) circuitry provides the power for transmitting a signal (including data modulated and carried by the signal) so that a base station or a receiver can receive the signal.

Power amplifier (PA) circuitry uses a large amount of power. The power amplifier (PA) module is one of the most power consuming components of a wireless communication device. Therefore it is very desirable to provide power amplifier (PA) circuitry that is power efficient.

A buck/boost switching converter is often used as the $V_{CC}$ power supply for a multiple mode (GSM/EDGE/WCDMA) radio frequency (RF) power amplifier (PA). When a buck/boost switching converter is used, it has to handle different operating modes depending on battery voltage requirements (Vin) and on output voltage (Vout) requirements and one load current (Iload) requirements.

FIG. 1 illustrates a schematic diagram of a simplified prior art buck/boost switching converter circuit 100 (sometimes simply referred to as switcher circuit 100 or as converter 100). The switcher circuit 100 comprises an error amplifier 110 and pulse width modulation (PWM) circuits and driver circuits 120. The inverting input of the error amplifier 110 receives a reference voltage signal $V_{REF}$ and the non-inverting input of the error amplifier 110 receives a feedback voltage signal $V_{FB}$.

The output of the error amplifier 110 (designated $V_C$) is provided as an input to the PWM and driver circuits 120. A first output line from the PWM and driver circuits 120 controls the operation of a first P-type metal oxide semiconductor (PMOS) transistor M1. A second output line from the PWM and driver circuits 120 controls the operation of a first N-type metal oxide semiconductor (NMOS) transistor M2. A third output line from the PWM and driver circuits 120 controls the operation of a second N-type metal oxide semiconductor (NMOS) transistor M3. A fourth output line from the PWM and driver circuits 120 controls the operation of a second P-type metal oxide semiconductor (PMOS) transistor M4.

The PMOS transistor M1 and the NMOS transistor M2 are connected together as shown in FIG. 1 and are connected to a first end of inductor 130. Power is supplied to the PMOS transistor M1 and to the NMOS transistor M2 by the battery voltage $V_{IN}$. A typical value of battery voltage $V_{IN}$ is three and six tenths volts (3.6 V). The NMOS transistor M3 and the PMOS transistor M4 are connected together as shown in FIG. 1 and are connected to a second end of inductor 130.

A first end of a first feedback resistor R1 is connected to a node that is located between the PMOS transistor M4 and the output node $V_{OUT}$ of the switcher circuit 100. A first end of an output capacitor C is connected to a node that is located between the first feedback resistor R1 node and the output node $V_{OUT}$. A second end of output capacitor C is connected to ground.

A second end of the first feedback resistor R1 is connected to a first end of a second feedback resistor that is designated R2. A second end of the second feedback resistor R2 is connected to ground. A feedback line 140 connects the node between the first feedback resistor R1 and the second feedback resistor R2 with the non-inverting input of the error amplifier 110.

It will be assumed that the switcher circuit 100 will be operated in a constant frequency mode (i.e., pulse width modulation (PWM) will be used). Although pulse frequency modulation (PFM) is also often used to provide the power supply in digital microprocessors, pulse frequency modulation (PFM) generates switching noise (or ripple) that is too high for radio frequency (RF) power amplifier (PA) applications. This is particularly so for GSM/EDGE applications.

If the output voltage $V_{OUT}$ is greater than the battery voltage $V_{IN}$ ($V_{OUT} > V_{IN}$), then the switcher circuit 100 will operate as a boost converter. If the switcher circuit 100 is operated in the boost mode, then the switcher circuit 100 will be in a continuous conduction mode (CCM) as the load current is high.

If the output voltage $V_{OUT}$ is less the battery voltage $V_{IN}$ ($V_{OUT} < V_{IN}$), then the switcher circuit 100 will operate as a buck converter. One can always run the switcher circuit 100 in a continuous conduction mode (CCM). However, the efficiency of the switcher circuit 100 is lower in the CCM mode than when the switcher circuit 100 is operated in a discontinuous conduction mode (DCM). This is due to additional conduction loss from the buck NMOS transistor M2 when the inductor current is reversed (becomes negative). It is therefore desirable to operate in the discontinuous conduction mode (DCM) to achieve higher efficiency. In the DCM mode the NMOS transistor M2 will stop conducting after the inductor current ramps down to zero.

There are therefore three distinct operating modes for the switcher circuit. The first operating mode is the continuous conduction mode (CCM) boost for high output power (designated CCM boost). The second operating mode is the continuous conduction mode (CCM) buck for medium output power (designated CCM buck). The third operating mode is the discontinuous conduction mode (DCM) for low output power.

It is well known that in radio frequency (RF) power amplifier (PA) applications, higher output power is required to provider higher supply voltages ($V_{CC}$) to a power amplifier (PA). If the switcher circuit 100 is operated in the boost mode, the switcher circuit 100 is in the continuous conduction mode (CCM) as the load current is high. The feedback loop compensation becomes very difficult to maintain its stability over all of the operating modes and the transition of the modes. This is because the transfer function from the duty cycle control to the output of the switcher circuit 100 is completely different in the three different operating modes.

In the CCM buck mode, the voltage mode converter acts as a double pole from the passive inductor-capacitor (LC) elements. In the CCM boost mode, the voltage mode converter also has a right half plane (RHP) zero in addition to the double pole. The right half plane (RHP) zero makes the feedback loop compensation very difficult. In the DCM buck mode, the voltage mode converter acts as a single low frequency pole.

FIGS. 2A through 2C illustrate typical converter transfer function bode plots (Gvd) from the duty cycle to the output for the three different modes. FIG. 2A shows a typical converter transfer function for the discontinuous conduction mode (DCM) buck mode. FIG. 2B shows a typical converter transfer function for the continuous conduction mode (CCM)

buck mode. FIG. 2C shows a typical converter transfer function for the continuous conduction mode (CCM) boost mode.

A simple feedback loop compensation scheme would employ the worst case scenario. A very low frequency dominant pole may be placed uniformly for all of the modes. The loop bandwidth would be low in any condition. This will result in a poor transient performance in all of the conditions.

Therefore, there is a need in the art for a system and method that is capable of providing a remedy for these prior art deficiencies. In particular, there is a need in the art for a system and method that provides an improved architecture for a buck/boost switcher circuit that provides optimized feedback loop compensation.

SUMMARY OF THE INVENTION

To address the above-discussed deficiencies of the prior art, it is a primary object of the present invention to provide optimized feedback loop compensation for a buck/boost switcher circuit. A buck/boost switching converter circuit may be operating in either a continuous conduction mode boost mode, or a continuous conduction mode buck mode, or a discontinuous conduction mode. The present invention comprises a compensation circuit that comprises an error amplifier circuit that comprises at least one compensation capacitor that provides an additional capacitance that adjusts a location of at least one dominant pole and at least one compensation zero of the buck/boost switching converter circuit to provide optimized feedback loop compensation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated) with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 2A illustrates a typical converter transfer function for a discontinuous conduction mode (DCM) buck mode of a buck/boost switching converter circuit;

FIG. 2B illustrates a typical converter transfer function for a continuous conduction mode (CCM) buck mode of a buck/boost switching converter circuit;

FIG. 2C illustrates a typical converter transfer function for a continuous conduction mode (CCM) boost mode of a buck/boost switching converter circuit;

FIG. 3A illustrates graphs that illustrate open loop gain problems with a fixed feedback loop compensation for a discontinuous conduction mode (DCM) buck mode of a buck/boost switching converter circuit;

FIG. 3B illustrates graphs that illustrate open loop gain problems with a fixed feedback loop compensation for a continuous conduction mode (CCM) buck mode of a buck/boost switching converter circuit;

FIG. 3C illustrates graphs that illustrate open loop gain problems with a fixed feedback loop compensation for a continuous conduction mode (CCM) boost mode of a buck/boost switching converter circuit;

FIG. 4A illustrates graphs that illustrate a result of using a dynamic feedback loop compensation of the present invention for a discontinuous conduction mode (DCM) buck mode of a buck/boost switching converter circuit;

FIG. 4B illustrates graphs that illustrate a result of using a dynamic feedback loop compensation of the present invention for a conduction mode (CCM) boost mode of a buck/boost switching converter circuit;

DETAILED DESCRIPTION OF THE INVENTION

Figure 1:
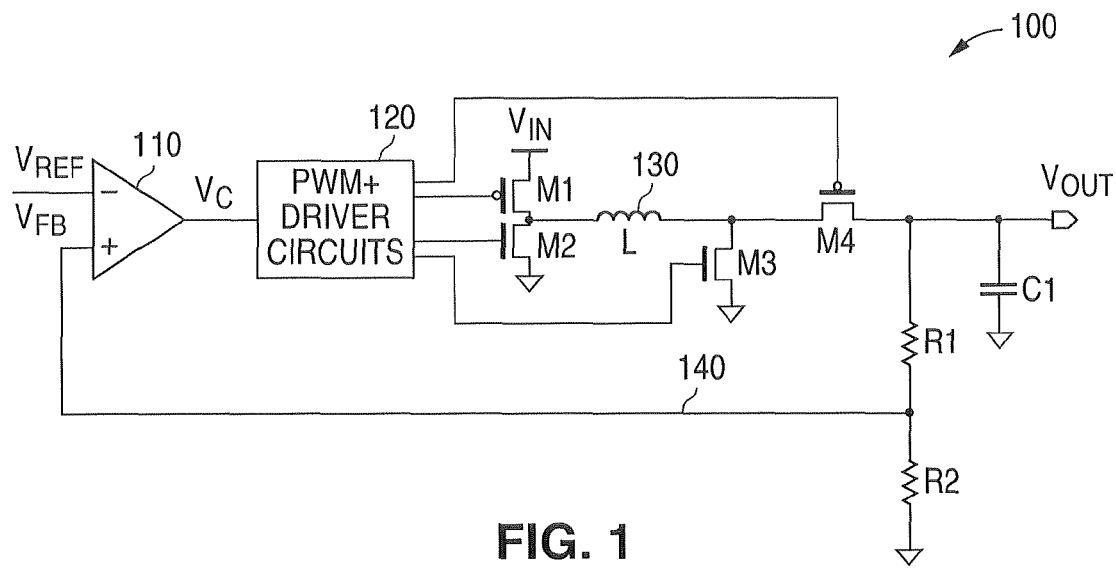
FIG. 1 illustrates a schematic diagram of a simplified prior art buck/boost switching converter circuit.

FIGS. 3 through 8 and the various embodiments used to describe the principles of the present invention in this patent document are by way of illustration only and should not be construed in any way to limit the scope of the invention. Those skilled in the art will understand that the principles of the present invention may be implemented in any type of suitably arranged power amplifier circuit.

To simplify the drawings the reference numerals from previous drawings will sometimes not be repeated for structures that have already been identified.

The present invention provides an apparatus and method for optimizing the feedback loop compensation of a buck/boost switching converter circuit in three individual modes. The present invention optimizes the feedback loop compensation for stability and possible high bandwidth. The present invention achieves individual optimized feedback loop compensation in all of the three modes and makes the compensation transition smooth when a first operating mode is changed to a second operating mode. The present invention optimizes the transient response in any mode and makes the mode transition smooth without creating an artificial transient. The manner in which these results are accomplished is described more fully below.

The first mode to be considered is the continuous conduction mode (CCM) buck mode. It will be assumed that the switcher circuit 100 is operating with this type of voltage mode control. The error amplifier and its related compensator introduce a high gain with a low frequency dominant pole to control the loop bandwidth and two (2) zeroes (to approximately cancel out the double pole by the inductor-capacitor (LC) elements)

The boost right hand plane (RHP) zero usually will be within the buck loop bandwidth. If the same feedback loop compensation for the CCM buck is being used for the boost converter, then the extra phase lag that is introduced by the right hand plane (RHP) zero will cause loop instability.

The present invention solves this problem by reducing the frequency of the dominant pole so that the loop cross-over frequency is much lower than the right hand plane (RHP) zero.

If the same feedback loop compensation for the CCM buck is being used for the DCM buck, then the load pole will get close to the error amplifier dominant pole so that the two (2) close poles will cause loop instability.

The present invention solves this problem by moving at least one (1) compensation zero to a lower frequency so that the loop gain has enough phase margin when the loop crossover frequency is reached.

FIGS. 3A through 3C illustrate graphs that illustrate open loop gain problems with a fixed feedback loop compensation approach. FIG. 3A illustrates graphs that illustrate open loop gain problems with a fixed feedback loop compensation for a discontinuous conduction mode (DCM) buck mode of a buck/boost switching converter circuit. FIG. 3B illustrates graphs that illustrate open loop gain problems with a fixed feedback loop compensation for a continuous conduction mode (CCM) buck mode of a buck/boost switching converter circuit. FIG. 3C illustrates graphs that illustrate open loop gain problems with a fixed feedback loop compensation for a continuous conduction mode (CCM) boost mode of a buck/boost switching converter circuit.

The present invention solves these problems using a dynamic feedback loop compensation. FIGS. 4A and 4B illustrate the results that may be obtained by using the apparatus and method of the present invention. FIG. 4A illustrates graphs that illustrate a result of using a dynamic feedback loop compensation of the present invention for a discontinuous conduction mode (DCM) buck mode of a buck/boost switching converter circuit. FIG. 4B illustrates graphs that illustrate a result of using a dynamic feedback loop compensation of the present invention for a conduction mode (CCM) boost mode of a buck/boost switching converter circuit.

The location of the dominant pole and compensation zero can be adjusted by the realized capacitance and/or its associated equivalent resistance. The adjustment may be implemented by switches which, in turn, may be controlled by a mode detection circuit.

The mode detection may be identified from the switcher circuit output or from the reference signal because the switcher circuit output and the reference signal indicate the power levels. The mode detection may also be identified from the control voltage $V_C$ (i.e., the output of the error amplifier 110). A higher value of control voltage $V_C$ indicates a wider duty cycle and a higher output voltage $V_{OUT}$. Whether the CCM mode or the DCM mode is in operation may also be determined from the inductor current zero cross sensing which is often available. Whether the buck mode or the boost mode is in operation may be determined from the switching node waveforms because the two switching switches are different in the two modes.

The question of how to handle the feedback loop compensation during a mode change will now be addressed. There is an abrupt change of related pole or zero location when the compensation capacitance or resistance is being switched in or out. However, the converter transfer function from the duty cycle to the output smoothly transitions during the mode change. This is because the switcher circuit in a first mode is still the same switcher circuit in a second mode and will have the same characteristics as it crosses the mode boundary.

From the feedback loop compensation point of view, the boost converter near the buck boundary or the DCM buck near the CCM boundary behaves in a similar manner as the CCM buck. So the CCM buck compensation should work for those near boundary boost or DCM modes. Only when the operating modes are too far away from the boundaries should special care be given. Because a buffer zone exists between the modes, precise accuracy of the compensation switching is not necessary. This makes the mode detection task easier.

Nevertheless, it is better to change the compensation smoothly rather than abruptly. This may be accomplished by dividing the total change into smaller steps. The mode detection needs to be able to divide the mode compensation buffer zone into finer resolution. This is equivalent to an analog to digital (A/D) process. The digital output controls the capacitance/resistance switches. A voltage controlled capacitor may also be used to control the compensation capacitance continuously instead of using digital switches.

Figure 5:
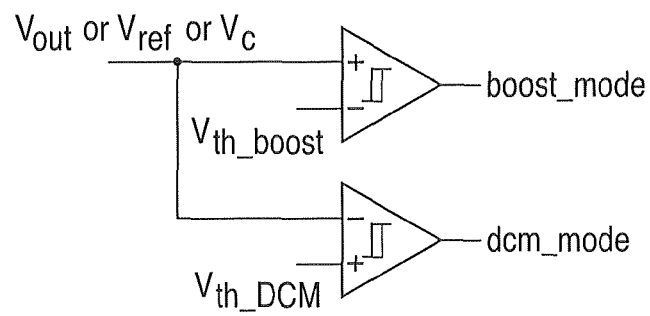
FIG. 5 illustrates an advantageous embodiment of a detection circuit that detects a boost mode and that detects a DCM mode in accordance with the principles of the present invention.

FIG. 5 illustrates an advantageous embodiment of a detection circuit 500 that detects the boost mode and that detects the DCM mode in accordance with the principles of the present invention. The detection circuit 500 comprises a first comparator 510 and a second comparator 520 connected as shown in FIG. 5.

The non-inverting input of the first comparator 510 receives either (1) the output voltage $V_{OUT}$, or (2) the reference voltage $V_{REF}$, or (3) the control voltage V. The inverting input of the first comparator 510 receives a voltage (designated $V_{TH-BOOST}$) that represents the threshold voltage value for the boost mode. When either the output voltage $V_{OUT}$, or the reference voltage $V_{REF}$, or the control voltage $V_C$ exceeds the threshold voltage value for the boost mode, the first comparator 510 detects the presence of the boost mode and BOOST_MODE signal at the output of the first comparator 510 goes high.

The inverting input of the second comparator 520 receives either (1) the output voltage $V_{OUT}$, or (2) the reference voltage $V_{REF}$, or (3) the control voltage V. The non-inverting input of the second comparator 520 receives a voltage (designated $V_{TH-DCM}$) that represents the threshold voltage value for the DCM mode. When the $V_{TH\_DCM}$ voltage exceeds either the output voltage $V_{OUT}$, or the reference voltage $V_{REF}$, or the control voltage $V_C$, the second comparator 520 detects the presence of the DCM mode and DCM_MODE signal at the output of the second comparator 520 goes high.

Figure 6:
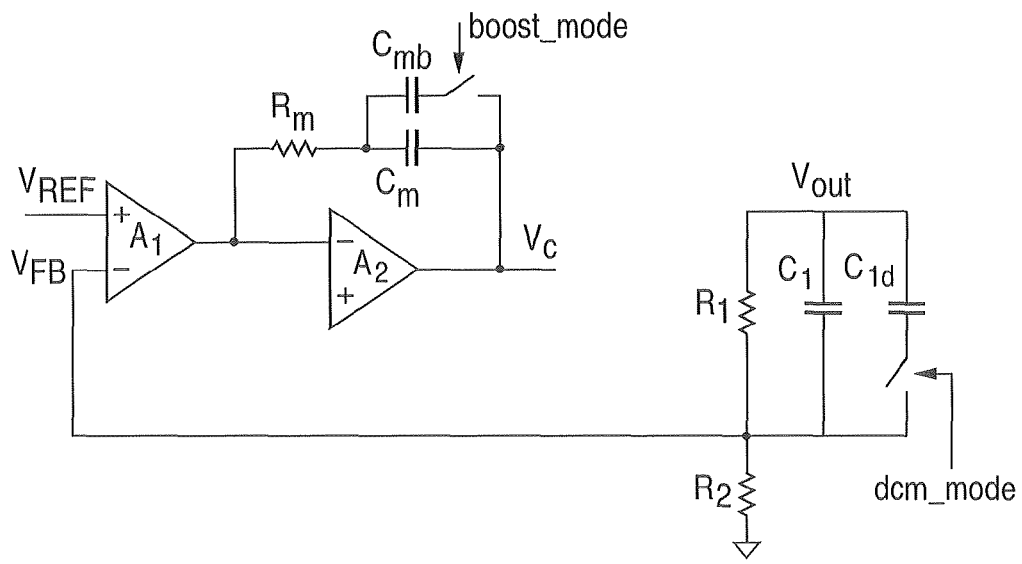
FIG. 6 illustrates an advantageous embodiment of a compensation circuit that provides dynamic and optimized feedback loop compensation for a switcher circuit in accordance with the principles of the present invention.

FIG. 6 illustrates an advantageous embodiment of a compensation circuit 600 that provides dynamic and optimized feedback loop compensation for a switcher circuit in accordance with the principles of the present invention. The compensation circuit 600 comprises a first amplifier 610 (designated A1) and a second amplifier 620 (designated A2). As shown in FIG. 6, the non-inverting input of the first amplifier 610 receives the reference voltage $V_{REF}$ and the inverting input of the first amplifier 610 receives the feedback voltage $V_{FB}$.

The output of the first amplifier 610 is provided to the non-inverting input of the second amplifier 620. The output of the second amplifier 620 is the control voltage $V_C$. A resistor Rm is connected in series with a capacitor Cm. The series combination of the resistor Rm and the capacitor Cm is connected in parallel with the second amplifier 620. A capacitor Cmb is connected in parallel with the capacitor Cm. The portion of the circuit with capacitor Cmb is connected to a switch that is operated by the BOOST_MODE signal.

On the output side of the compensation circuit 600, the first feedback resistor R1 of the switcher circuit is connected in parallel with a first output capacitor C1 and a second output capacitor C1$d$. The portion of the circuit with capacitor C1$d$ is connected to a switch that is operated by the DCM_MODE signal.

The dominant pole in the compensation circuit 600 is the Miller pole located at $1/(2*pi*Rout1*Cm*A2)$ where the expression Rout1 is the high output impedance of the A1 stage (i.e., the first amplifier 610 stage). Two compensation zeroes are introduced for the CCM buck converter. One zero is realized by $1/(2*pi*((Rm-1)/Gm2)*Cm)$ where the expression Gm2 is the transconductance of the A2 stage (i.e., the second amplifier 620 stage).

The other zero is realized by the feedback network located at $1/(2*pi*R1*C1)$. The dominant pole is shifted to a lower frequency in the boost mode by the additional capacitor Cmb controlled by the BOOST_MODE detection signal. One zero is moved the lower frequency by additional capacitance from the feedback network capacitor C1$d$ which is controlled by the DCM_MODE detection signal. The frequency shift may also be implemented by additional resistance of Rm. Both zeroes may be shifted to a lower frequency.

Figure 7:
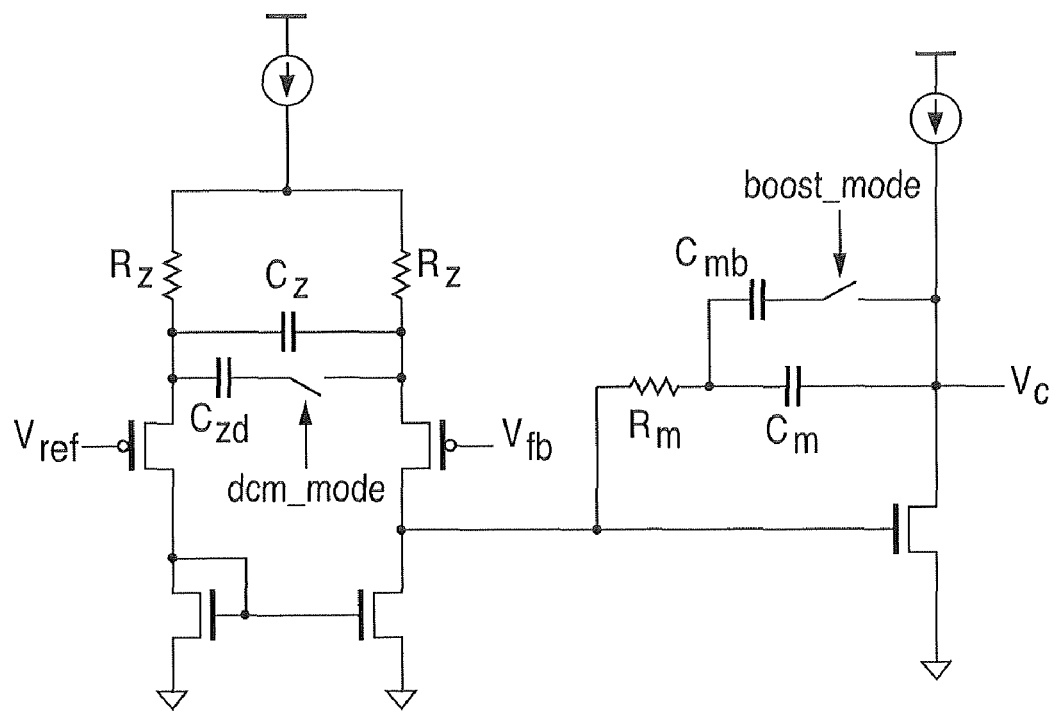
FIG. 7 illustrates another advantageous embodiment of a compensation circuit that provides dynamic and optimized feedback loop compensation for a switcher circuit in accordance with the principles of the present invention.

FIG. 7 illustrates another advantageous embodiment of a compensation circuit 700 that provides dynamic and optimized feedback loop compensation for a switcher circuit in accordance with the principles of the present invention. In the compensation circuit 700 a two-stage amplifier is used. Two compensation zeroes are introduced fro the CCM buck converter. The first stage is a gain stage with a zero introduced by its source degeneration location at $1/(2*pi*Rz*2Cz)$. The dominant pole is again from the Miller pole Cm. In the boost mode, the dominant low frequency pole is shifted to a lower frequency to eliminate the impact of the right hand plane (RHP) zero in the boost converter by additional capacitance introduced by capacitor Cmb.

In the DCM buck mode, a compensation zero is shifted to a lower frequency from the first stage zero by additional capacitance introduced by capacitor Czd controlled by the DCM_MODE detection signal. The frequency shift zero may be realized from the second stage zero from the resistor Rm. Both zeroes may be shifted to a lower frequency.

Figure 8:
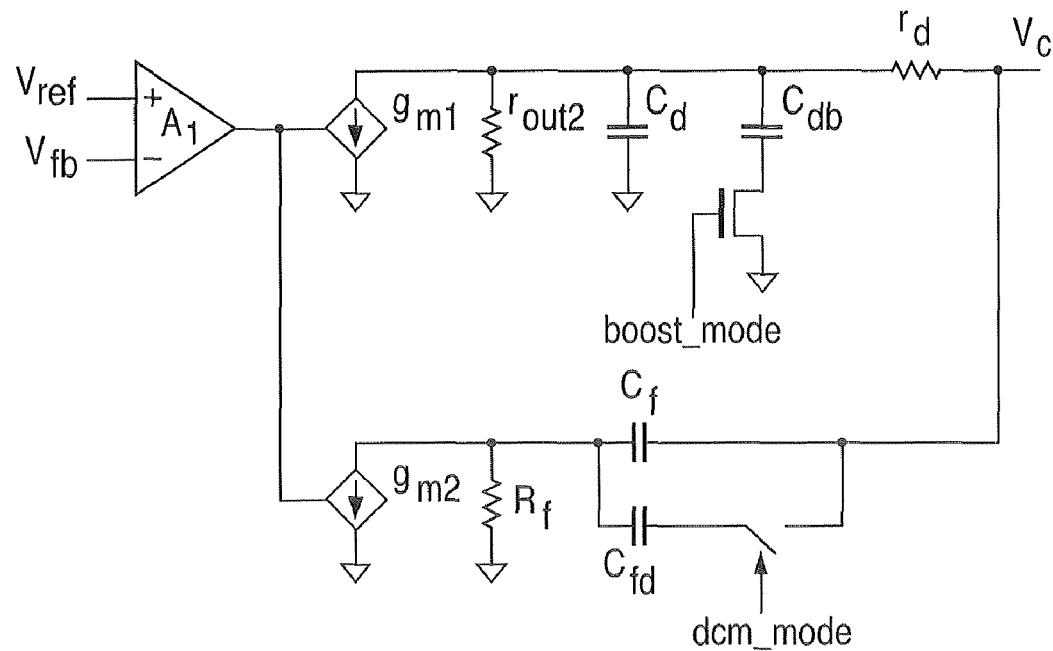
FIG. 8 illustrates another advantageous embodiment of a compensation circuit that provides dynamic and optimized feedback loop compensation for a switcher circuit in accordance with the principles of the present invention.

FIG. 8 illustrates another advantageous embodiment of a compensation circuit 800 that provides dynamic and optimized feedback loop compensation for a switcher circuit in accordance with the principles of the present invention. In the compensation circuit 800 a two-stage amplifier is used. The first stage may be a low gain stage with a high frequency pole associated with a low output impedance. The dominant pole is from the output of the second stage located at $1/(2*pi*Rout2*Cd)$ where the expression Rout2 is the output impedance of the high gain second stage.

Two compensation zeroes are introduced for the CCM buck converter. One zero is achieved by $1/(2*pi*Cd*Rd)$. The other zero is achieved by the fast Cf path and its location is proportional to Cd. In the boost mode, the dominant pole is shifted to a lower frequency by additional capacitance introduced by capacitor Cdb. In the DCM buck mode, one zero is shifted to a lower frequency by additional capacitance introduced by capacitor Cfd. The other zero or both zeroes may be shifted to a lower frequency in the DCM mode.

Although the present invention has been described with an exemplary embodiment, various changes and modifications may be suggested to one skilled in the art. It is intended that the present invention encompass such changes and modifications as fall within the scope of the appended claims.

What is claimed is:

1. A compensation circuit that provides feedback loop compensation for a buck/boost switching converter circuit, the compensation circuit comprising:
   an error amplifier circuit that comprises at least one compensation capacitor, the error amplifier circuit configured to use the at least one compensation capacitor to adjust a location of at least one dominant pole of the buck/boost switching converter circuit; and
   a mode detector circuit configured to:
      detect when the buck/boost switching converter circuit is operating in one of: a boost mode and a discontinuous conduction mode;
      output a boost mode signal when the buck/boost switching converter circuit is operating in the boost mode; and
      output a discontinuous conduction mode signal when the buck/boost switching converter circuit is operating in the discontinuous conduction mode.

2. The compensation circuit as set forth in claim 1, wherein the error amplifier circuit is configured to provide a first additional capacitance by switching in a first of the at least one compensation capacitor to the error amplifier circuit when the buck/boost switching converter circuit is operating in the boost mode.

3. The compensation circuit as set forth in claim 2, wherein the error amplifier circuit is configured to provide a second additional capacitance by switching in a second of the at least one compensation capacitor to the error amplifier circuit when the buck/boost switching converter circuit is operating in the discontinuous conduction mode.

4. The compensation circuit as set forth in claim 2, wherein the error amplifier circuit is configured to reduce a frequency of the at least one dominant pole so that a loop cross over frequency of the buck/boost switching converter circuit is less than a right hand plane zero of the buck/boost switching converter circuit.

5. The compensation circuit as set forth in claim 1, wherein the error amplifier circuit is further configured to use the at least one compensation capacitor to adjust a location of at least one compensation zero of the buck/boost switching converter circuit.

6. The compensation circuit as set forth in claim 5, wherein the error amplifier circuit is configured to provide a first additional capacitance by switching in a first of the at least one compensation capacitor to the error amplifier circuit when the buck/boost switching converter circuit is operating in the boost mode.

7. The compensation circuit as set forth in claim 5, wherein the error amplifier circuit is configured to provide a second additional capacitance by switching in a second of the at least one compensation capacitor to the error amplifier circuit when the buck/boost switching converter circuit is operating in the discontinuous conduction mode.

8. The compensation circuit as set forth in claim 5, wherein the error amplifier circuit is configured to reduce a frequency of the at least one compensation zero.

9. The compensation circuit as set forth in claim 5, wherein the error amplifier circuit is configured to provide optimized feedback loop compensation for the buck/boost switching converter circuit when the buck/boost switching converter circuit is operating in one of: the boost mode, a buck mode, and the discontinuous conduction mode.

10. A method for providing feedback loop compensation for a buck/boost switching converter circuit, the method comprising the steps of:
    operating a compensation circuit that comprises an error amplifier circuit;
    detecting when the buck/boost switching converter circuit is operating in one of: a boost mode and a discontinuous conduction mode;
    generating a boost mode signal when the buck/boost switching converter circuit is operating in the boost mode;
    generating a discontinuous conduction mode signal when the buck/boost switching converter circuit is operating in the discontinuous conduction mode;
    providing a first additional capacitance from at least one compensation capacitor to the error amplifier circuit to adjust a location of at least one dominant pole of the buck/boost switching converter circuit; and
    using the adjusted location of the at least one dominant pole to provide the feedback loop compensation for the buck/boost switching converter circuit.

11. The method as set forth in claim 10, further comprising:
    determining from the boost mode signal that the buck/boost switching converter circuit is operating in the boost mode;
    wherein adjusting the location of the at least one dominant pole of the buck/boost switching converter circuit comprises switching in a first of the at least one compensation capacitor to the error amplifier circuit.

12. The method as set forth in claim 10, further comprising:
    determining from the discontinuous conduction mode signal that the buck/boost switching converter circuit is operating in the discontinuous conduction mode; and
    adjusting a location of at least one compensation zero of the buck/boost switching converter circuit by switching in a second of the at least one compensation capacitor to the error amplifier circuit.

13. The method as set forth in claim 11, further comprising:
    reducing a frequency of the at least one dominant pole so that a loop cross over frequency of the buck/boost switching converter circuit is less than a right hand plane zero of the buck/boost switching converter circuit.

14. The method as set forth in claim 10, further comprising:
    using the at least one compensation capacitor to adjust a location of at least one compensation zero of the buck/boost switching converter circuit.

15. The method as set forth in claim 14, further comprising:
    determining from the boost mode signal that the buck/boost switching converter circuit is operating in the boost mode; and
    adjusting the location of the at least one dominant pole of the buck/boost switching converter circuit by switching in a first of the at least one compensation capacitor to the error amplifier circuit.

16. The method as set forth in claim 14, further comprising:
    determining from the discontinuous conduction mode signal that the buck/boost switching converter circuit is operating in the discontinuous conduction mode; and
    adjusting the location of the at least one compensation zero of the buck/boost switching converter circuit by switching in a second of the at least one compensation capacitor to the error amplifier circuit.

17. The method as set forth in claim 15, further comprising:
    reducing a frequency of the at least one compensation zero so that a loop gain has sufficient phase margin when a loop cross over frequency is reached.

18. The method as set forth in claim 14 further comprising:
    providing from the error amplifier circuit optimized feedback loop compensation for the buck/boost switching converter circuit when the buck/boost switching converter circuit is operating in one of: the boost mode, a buck mode, and the discontinuous conduction mode.

19. A circuit comprising:
    a mode detector circuit configured to:
        detect when a buck/boost switching converter circuit is operating in one of: a continuous conduction mode and a discontinuous conduction mode;
        output a continuous conduction mode signal when the buck/boost switching converter circuit is operating in the continuous conduction mode; and
        output a discontinuous conduction mode signal when the buck/boost switching converter circuit is operating in the discontinuous conduction mode; and
    an error amplifier circuit that comprises at least one compensation capacitor, the error amplifier circuit configured to use the at least one compensation capacitor to:
        adjust a location of at least one dominant pole of the buck/boost switching converter circuit when the buck/boost switching converter circuit is operating in the continuous conduction mode; and
        adjust a location of at least one compensation zero of the buck/boost switching converter circuit when the buck/boost switching converter circuit is operating in the discontinuous conduction mode.

20. The circuit as set forth in claim 19, wherein the mode detector circuit is configured to detect when the buck/boost switching converter circuit is operating in the continuous conduction mode by detecting when the buck/boost switching converter circuit is operating in a boost mode.

* * * * *